US012566793B2

(12) United States Patent
Su et al.

(10) Patent No.: US 12,566,793 B2
(45) Date of Patent: *Mar. 3, 2026

(54) MULTIMEDIA CONTENT PUBLISHING METHOD AND APPARATUS, AND ELECTRONIC DEVICE AND STORAGE MEDIUM

(71) Applicant: BEIJING BYTEDANCE NETWORK TECHNOLOGY CO., LTD., Beijing (CN)

(72) Inventors: Kai Su, Beijing (CN); Changhu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,626

(22) Filed: Nov. 22, 2024

(65) Prior Publication Data

US 2025/0086224 A1     Mar. 13, 2025

Related U.S. Application Data

(63) Continuation of application No. 18/029,074, filed as application No. PCT/CN2021/117199 on Sep. 8, 2021, now Pat. No. 12,182,195.

(30) Foreign Application Priority Data

Sep. 30, 2020     (CN) ......................... 202011061795.9

(51) Int. Cl.
*G06F 16/48*     (2019.01)
*G06F 16/44*     (2019.01)
*G06F 16/45*     (2019.01)

(52) U.S. Cl.
CPC ............ *G06F 16/489* (2019.01); *G06F 16/44* (2019.01); *G06F 16/45* (2019.01)

(58) Field of Classification Search
CPC .............................................. G06F 16/48–489
See application file for complete search history.

(56) References Cited

U.S. PATENT DOCUMENTS 5,832,499 A     11/1998  Gustman
8,996,629 B1     3/2015  Datar et al.
(Continued)

FOREIGN PATENT DOCUMENTS

CN     107577753 A     1/2018
CN     108304761 A     7/2018
(Continued)

OTHER PUBLICATIONS

International Patent Application No. PCT/CN2021/117199; Int'l Search Report; dated Dec. 17, 2021; 2 pages.
(Continued)

*Primary Examiner* — Kimberly L Wilson
*Assistant Examiner* — Nirav K Khakhar
(74) *Attorney, Agent, or Firm* — BakerHostetler

(57)     ABSTRACT

Provided are a multimedia content publishing method and apparatus, and an electronic device and a storage medium. The method includes: determining multimedia content to be published; acquiring at least one candidate time-sensitivity tag that matches the multimedia content; determining at least one target time-sensitivity tag selected from the at least one candidate time-sensitivity tag; and generating multimedia content publishing information that includes the target time-sensitivity tag. In the disclosure, candidate time-sensitivity tags are provided for a publisher of multimedia content, such that the publisher selects a target time-sensitivity tag therefrom; and the added target time-sensitivity tag can be used (Continued)

Determine multimedia content to be published — S101

Acquire at least one candidate time-sensitivity tag that matches the multimedia content — S102

Determine at least one target time-sensitivity tag selected from the at least one candidate time-sensitivity tag — S103

Generate multimedia content publishing information that comprises the target time-sensitivity tag — S104 for reference when related search results are provided for a user who initiates a search request, thereby improving the accuracy of the search results.

17 Claims, 8 Drawing Sheets

(56)                  References Cited

U.S. PATENT DOCUMENTS

| | | |
|---|---|---|
| 2003/0172033 A1 | 9/2003 | Risan et al. |
| 2010/0030798 A1 | 2/2010 | Kumar et al. |
| 2011/0289098 A1 | 11/2011 | Oztaskent et al. |
| 2013/0091424 A1 | 4/2013 | Dallari et al. |
| 2013/0346588 A1 | 12/2013 | Zhang et al. |
| 2015/0113013 A1 | 4/2015 | Rys et al. |
| 2019/0266394 A1 | 8/2019 | Yu et al. |

FOREIGN PATENT DOCUMENTS

| | | |
|---|---|---|
| CN | 108829893 A | 11/2018 |
| CN | 110457504 A | 11/2019 |
| CN | 111353071 A | 6/2020 |
| CN | 111611492 A | 9/2020 |
| CN | 111949864 A | 11/2020 |
| CN | 112199526 A | 1/2021 |

OTHER PUBLICATIONS

Z. Mingjun; "Research and Implementation of Wideband High Resolution Frequency Synthesizer"; School of Information and Software Engineering; Master Thesis; China Academic Journal Electronic Publishing House; Mar. 2018; 86 pages (*English Abstract* see pp. 6 and 7).

Sarcar et al.; "Towards Ability-Based Optimization for Aging Users"; Int'l Symposium on Interactive Technology and Ageing Populations; Oct. 2016; 10 pages.

Yu et al.; "Personalized Multimedia Alert Service of Fall Event for Ageing in Place"; First Int'l Conf. on Internet Multimedia Computing and Service; Nov. 2009; p. 188-195.

China Patent Application No. 202011061795.9; Office Action; dated Dec. 5, 2022; 24 pages.

China Patent Application No. 202011061795.9; Notification Patent Registration; dated Feb. 15, 2023; 5 pages.

International Patent Application No. PCT/CN2021/117199; Int'l Written Opinion and Search Report; dated Dec. 17, 2021; 11 pages.

International Patent Application No. PCT/CN2021/117199; Int'l Preliminary Report on Patentability; dated Apr. 13, 2023; 13 pages.

S101

Determine multimedia content to be published

S102

Acquire at least one candidate time-sensitivity tag that matches the multimedia content

S103

Determine at least one target time-sensitivity tag selected from the at least one candidate time-sensitivity tag

S104

Generate multimedia content publishing information that comprises the target time-sensitivity tag

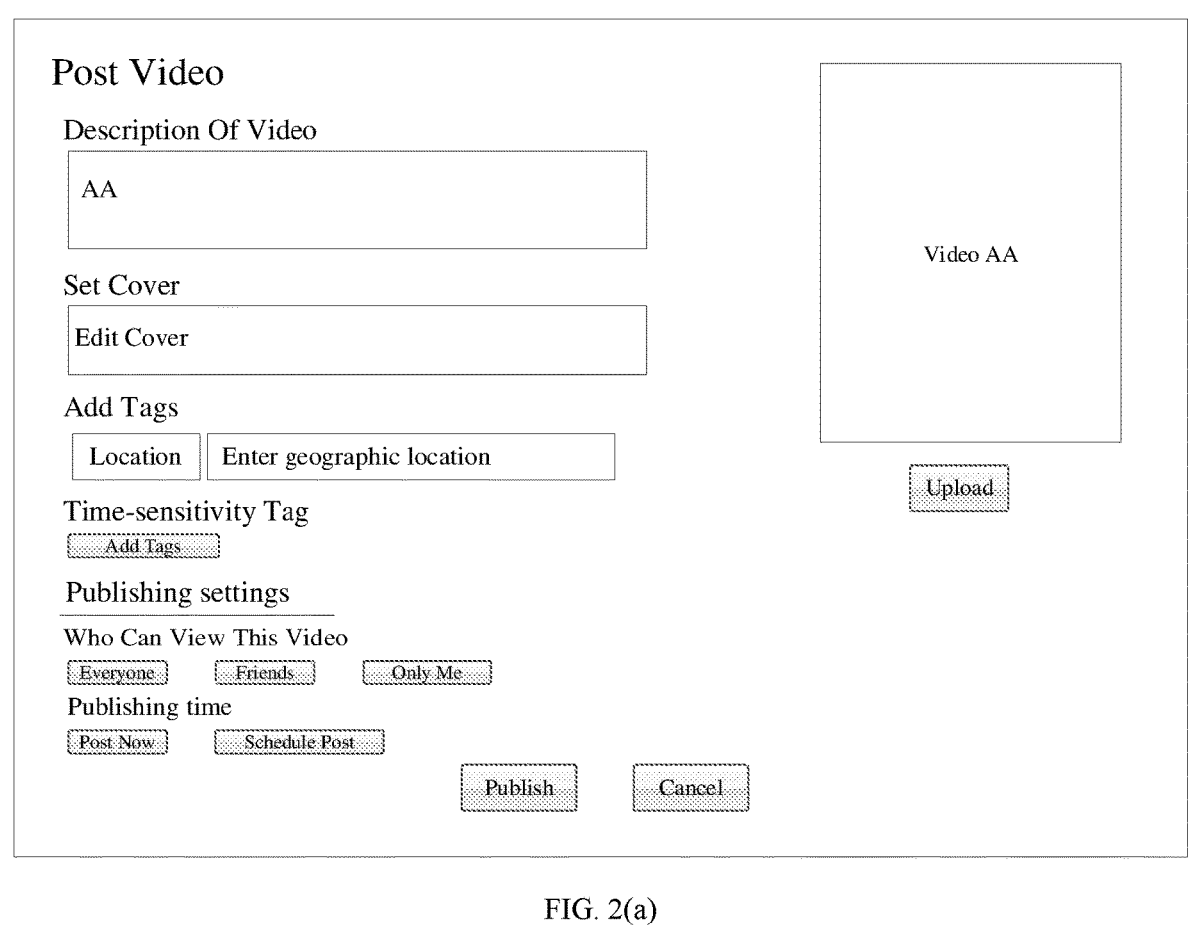

Post Video

Description Of Video

AA

Set Cover

Edit Cover

Add Tags

| Location | Enter geographic location |

Time-sensitivity Tag

Add Tags

Publishing settings

Who Can View This Video

Everyone    Friends    Only Me

Publishing time

Post Now    Schedule Post

Publish    Cancel

Video AA

Upload

FIG. 2(a)

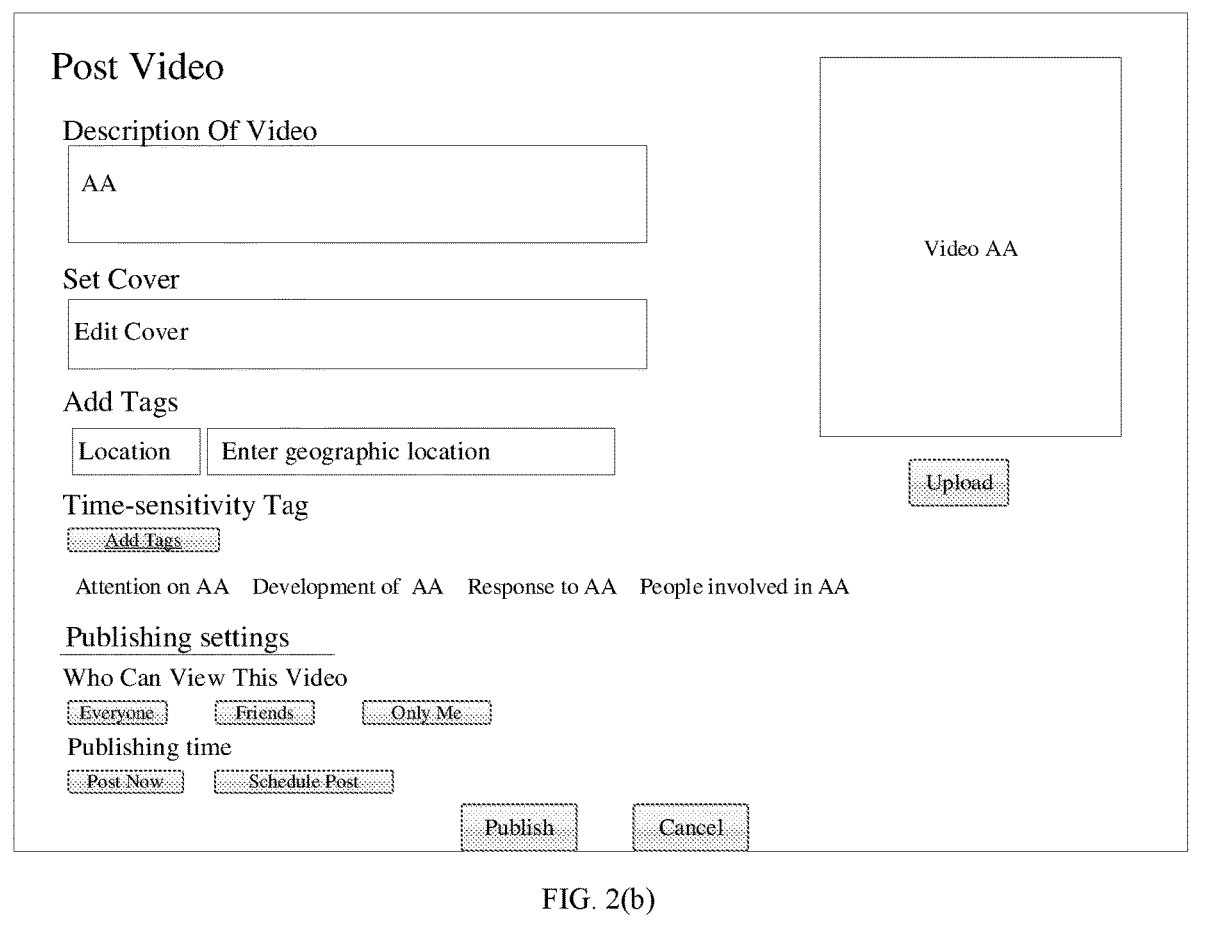

Post Video

Description Of Video

AA

Video AA

Set Cover

Edit Cover

Add Tags

| Location | Enter geographic location |

Time-sensitivity Tag

Add Tags

Upload

Attention on AA    Development of  AA    Response to AA    People involved in AA Publishing settings Who Can View This Video Everyone          Friends          Only Me Publishing time Post Now          Schedule Post Publish          Cancel

FIG. 2(b)

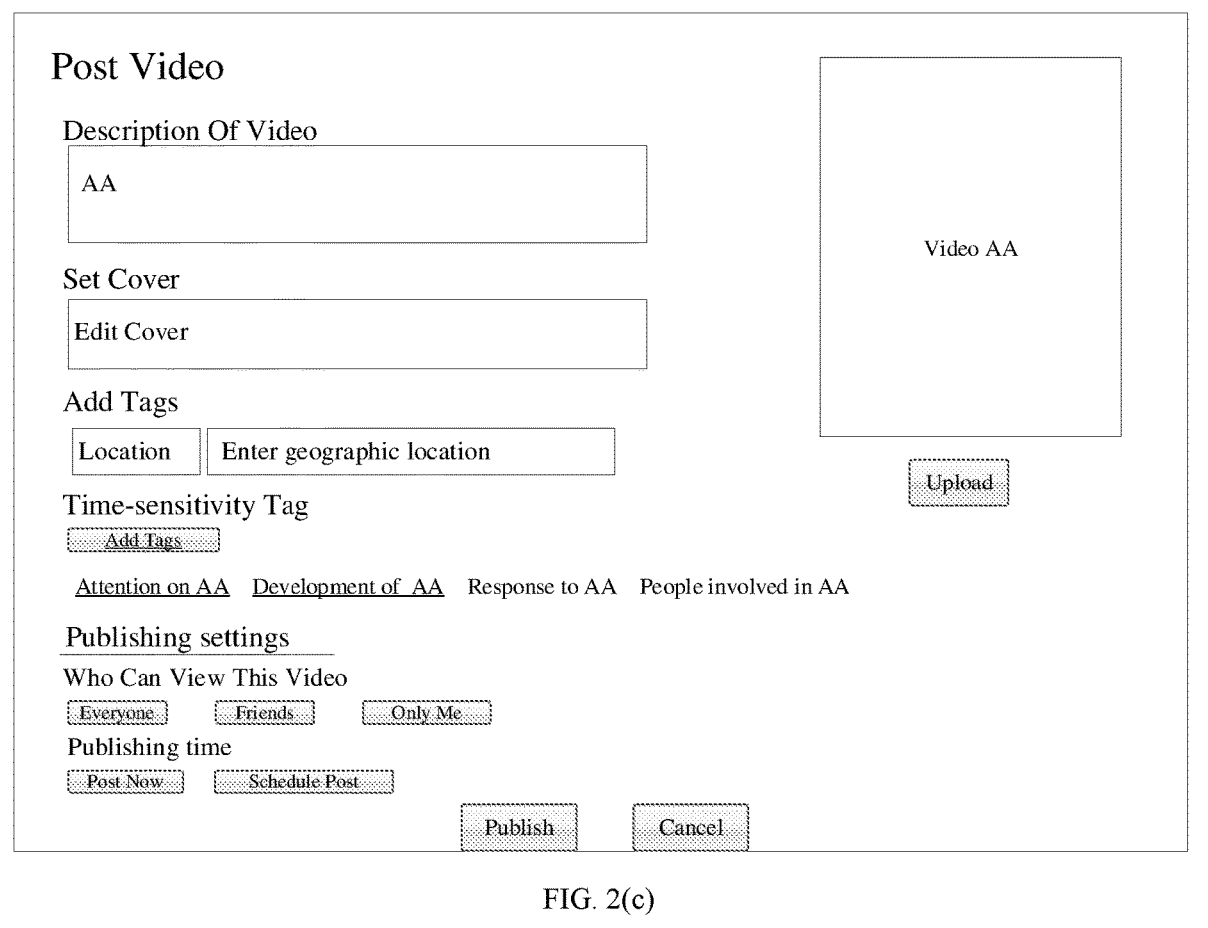

Post Video

Description Of Video

| AA |
|---|

Set Cover

| Edit Cover |
|---|

Add Tags

| Location | Enter geographic location |
|---|---|

Time-sensitivity Tag

| Add Tags |
|---|

Attention on AA    Development of AA    Response to AA    People involved in AA

Publishing settings

Who Can View This Video

| Everyone | | Friends | | Only Me |
|---|---|---|---|---|

Publishing time

| Post Now | | Schedule Post |
|---|---|---|

| Publish | | Cancel |
|---|---|---|

Video AA

| Upload |
|---|

FIG. 2(c)

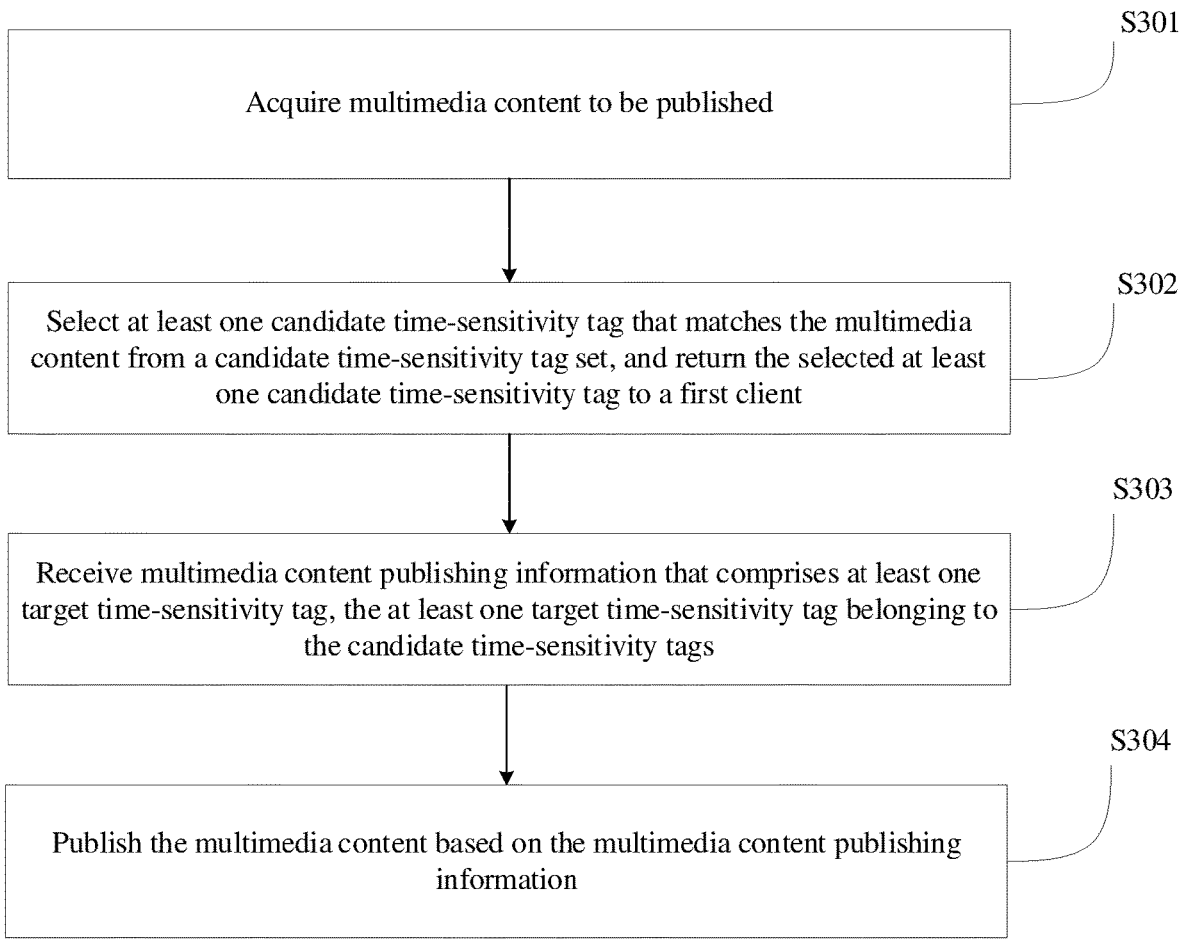

S301

Acquire multimedia content to be published

S302

Select at least one candidate time-sensitivity tag that matches the multimedia content from a candidate time-sensitivity tag set, and return the selected at least one candidate time-sensitivity tag to a first client

S303

Receive multimedia content publishing information that comprises at least one target time-sensitivity tag, the at least one target time-sensitivity tag belonging to the candidate time-sensitivity tags

S304

Publish the multimedia content based on the multimedia content publishing information

FIG. 3

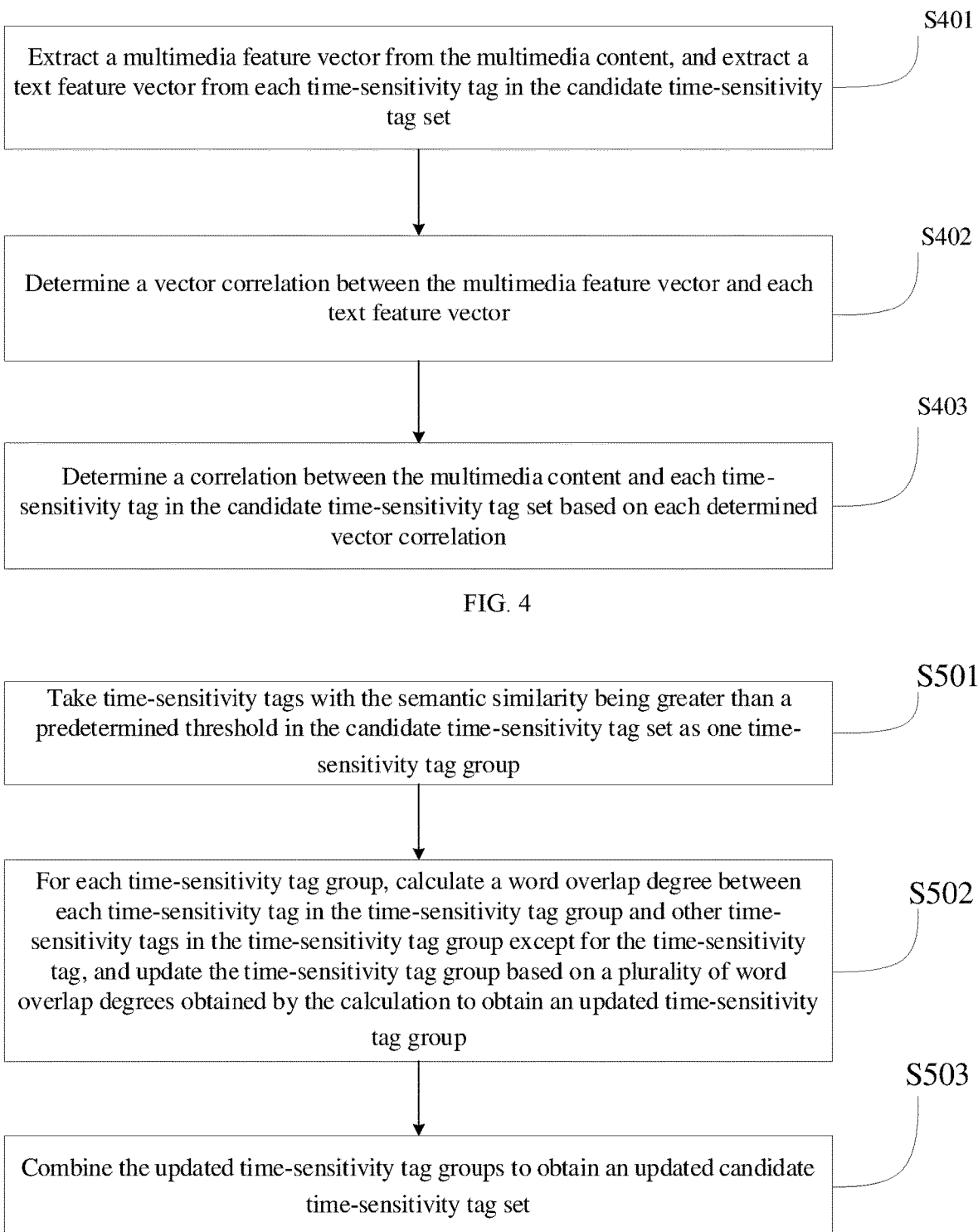

S401

Extract a multimedia feature vector from the multimedia content, and extract a text feature vector from each time-sensitivity tag in the candidate time-sensitivity tag set

S402

Determine a vector correlation between the multimedia feature vector and each text feature vector

S403

Determine a correlation between the multimedia content and each time-sensitivity tag in the candidate time-sensitivity tag set based on each determined vector correlation

Take time-sensitivity tags with the semantic similarity being greater than a predetermined threshold in the candidate time-sensitivity tag set as one time-sensitivity tag group

S502

For each time-sensitivity tag group, calculate a word overlap degree between each time-sensitivity tag in the time-sensitivity tag group and other time-sensitivity tags in the time-sensitivity tag group except for the time-sensitivity tag, and update the time-sensitivity tag group based on a plurality of word overlap degrees obtained by the calculation to obtain an updated time-sensitivity tag group

S503

Combine the updated time-sensitivity tag groups to obtain an updated candidate time-sensitivity tag set

Content determining
module

602

Tag acquisition module

603

Tag determining module

604

Information generation
module

605

Content publishing
module

701

Content acquisition
module

706

702

Tag set updating module  · · ·   Tag selection module

703

Information receiving
module

705

704

Content pushing module  · · ·   Content publishing
module

MULTIMEDIA CONTENT PUBLISHING METHOD AND APPARATUS, AND ELECTRONIC DEVICE AND STORAGE MEDIUM

CROSS REFERENCE TO RELATED APPLICATIONS

The disclosure is a continuation of U.S. patent application Ser. No. 18/029,074, titled "MULTIMEDIA CONTENT PUBLISHING METHOD AND APPARATUS, AND ELECTRONIC DEVICE AND STORAGE MEDIUM", filed on Mar. 28, 2023, which is the U.S. National Stage of International Application No. PCT/CN2021/117199, titled "MULTIMEDIA CONTENT PUBLISHING METHOD AND APPARATUS, AND ELECTRONIC DEVICE AND STORAGE MEDIUM", filed on Sep. 8, 2021, which claims priority to Chinese Patent Application No. 202011061795.9, field on Sep. 30, 2020, titled "MULTIMEDIA CONTENT PUBLISHING METHOD AND APPARATUS, AND ELECTRONIC DEVICE AND STORAGE MEDIUM", the entire contents of all of which are incorporated herein by reference.

FIELD

The disclosure relates to the technical field of information processing, and in particular to a multimedia content publishing method and apparatus, and an electronic device and a storage medium.

BACKGROUND

With the development of Internet technologies, a variety of We Media social applications (APPs) have emerged, where users can upload their own multimedia content (such as videos and pictures) and can publish the uploaded multimedia content after adding corresponding titles for the uploaded multimedia content. Due to a large amount of multimedia content published on popular APPs, it is difficult to find accurate search results for users based on search requests of the users when the users search multimedia content.

For some hot real-time news content, a lot of valuable multimedia content may not be searched and read by users in time after being published, which, on the one hand, leads to waste of resources, and on the other hand, cannot well meet the search needs of the users.

SUMMARY

Embodiments of the disclosure at least provide a multimedia content publishing method. Candidate time-sensitivity tags are provided for a publisher of multimedia content, such that the publisher selects a target time-sensitivity tag therefrom; and the added target time-sensitivity tag can be used for reference when related search results are provided for a user who initiates a search request, thereby improving the accuracy of the search results.

The disclosure mainly includes the following aspects:

The first aspect of the disclosure provides a multimedia content publishing method, comprising:

determining multimedia content to be published;

acquiring at least one candidate time-sensitivity tag that matches the multimedia content;

determining at least one target time-sensitivity tag selected from the at least one candidate time-sensitivity tag; and generating multimedia content publishing information that comprises the target time-sensitivity tag.

The second aspect of the disclosure provides a multimedia content publishing method, comprising:

acquiring multimedia content to be published;

selecting at least one candidate time-sensitivity tag that matches the multimedia content from a candidate time-sensitivity tag set, and returning the selected at least one candidate time-sensitivity tag to a first client;

receiving multimedia content publishing information that comprises at least one target time-sensitivity tag, the at least one target time-sensitivity tag belonging to the candidate time-sensitivity tags; and publishing the multimedia content based on the multimedia content publishing information.

The third aspect of the disclosure provides a multimedia content publishing apparatus, comprising:

a content determining module, configured to determine multimedia content to be published;

a tag acquisition module, configured to acquire at least one candidate time-sensitivity tag that matches the multimedia content;

a tag determining module, configured to determine at least one target time-sensitivity tag selected from the at least one candidate time-sensitivity tag; and an information generation module, configured to generate multimedia content publishing information that comprises the target time-sensitivity tag.

The fourth aspect of the disclosure provides a multimedia content publishing apparatus, comprising:

a content acquisition module, configured to acquire multimedia content to be published;

a tag selection module, configured to select at least one candidate time-sensitivity tag that matches the multimedia content from a candidate time-sensitivity tag set, and return the selected at least one candidate time-sensitivity tag to a first client;

an information receiving module, configured to receive multimedia content publishing information that comprises at least one target time-sensitivity tag, the at least one target time-sensitivity tag belonging to the candidate time-sensitivity tags; and a content publishing module, configured to publish the multimedia content based on the multimedia content publishing information.

The fifth aspect of the disclosure provides an electronic device, comprising: a processor, a memory, and a bus, wherein the memory stores machine-readable instructions executable by the processor, when the electronic device runs, the processor communicates with the memory through the bus, and the machine-readable instructions, when executed by the processor, cause the electronic device to execute the steps of the multimedia content publishing method provided in any of the embodiments of the first or second aspect.

The sixth aspect of the disclosure provides a computer readable storage medium, storing computer program that upon execution by an electronic device, cause the electronic device to perform the steps of the multimedia content publishing method provided in any of the embodiments of the first or second aspect.

By the adoption of the above multimedia content publishing solution, under the condition that multimedia content to be published is determined, at least one candidate time-sensitivity tag that matches the multimedia content can be acquired. In this way, if a target time-sensitivity tag selected from the at least one candidate time-sensitivity tag is determined, multimedia content publishing information that includes the target time-sensitivity tag can be generated. The candidate time-sensitivity tags may be time-sensitivity tags that is dynamically updated based on user real-time search data. In this way, the target time-sensitivity tag selected by a publisher reflects highly time-sensitive content, so multimedia content with high time-sensitivity can be provided for subsequent search to a certain extent. In addition, the target time-sensitivity tag is further confirmed and selected by the publisher from the candidate time-sensitivity tags, which further improves the accuracy of the target time-sensitivity tag serving as a query index of multimedia content, so as to provide more accurate and effective search results for users who initiate search requests, and improve the quality of service of a search platform.

In order to make the above objectives, features and advantages of the disclosure more obvious and understandable, detailed description is given as follows by giving preferred embodiments below and in conjunction with the attached drawings.

BRIEF DESCRIPTION OF THE DRAWINGS

In order to explain the technical solution of the embodiments of the disclosure more clearly, the drawings needed to be used in the embodiments will be briefly introduced below. The drawings here, which are incorporated in and constitute a part of the specification, illustrate embodiments consistent with the disclosure and together with the specification serve to illustrate the technical solutions of the disclosure. The following drawings only show some embodiments of the disclosure, and thus should not be regarded as limiting the scope. Those skilled in the art can further obtain other relevant drawings according to these drawings without any creative effort.

FIG. 2(a) shows an application schematic diagram of a multimedia content publishing method provided by Embodiment I of the disclosure;

FIG. 2(b) shows an application schematic diagram of another multimedia content publishing method provided by Embodiment I of the disclosure;

FIG. 2(c) shows an application schematic diagram of yet another multimedia content publishing method provided by Embodiment I of the disclosure;

FIG. 3 shows a flowchart of a multimedia content publishing method provided by Embodiment II of the disclosure;

FIG. 4 shows a flowchart of a specific method for determining a similarity in a multimedia content publishing method provided by Embodiment II of the disclosure;

FIG. 5 shows a flowchart of a specific method for updating a time-sensitivity tag set in a multimedia content publishing method provided by Embodiment II of the disclosure;

DETAILED DESCRIPTION OF THE EMBODIMENTS

Figure 1:
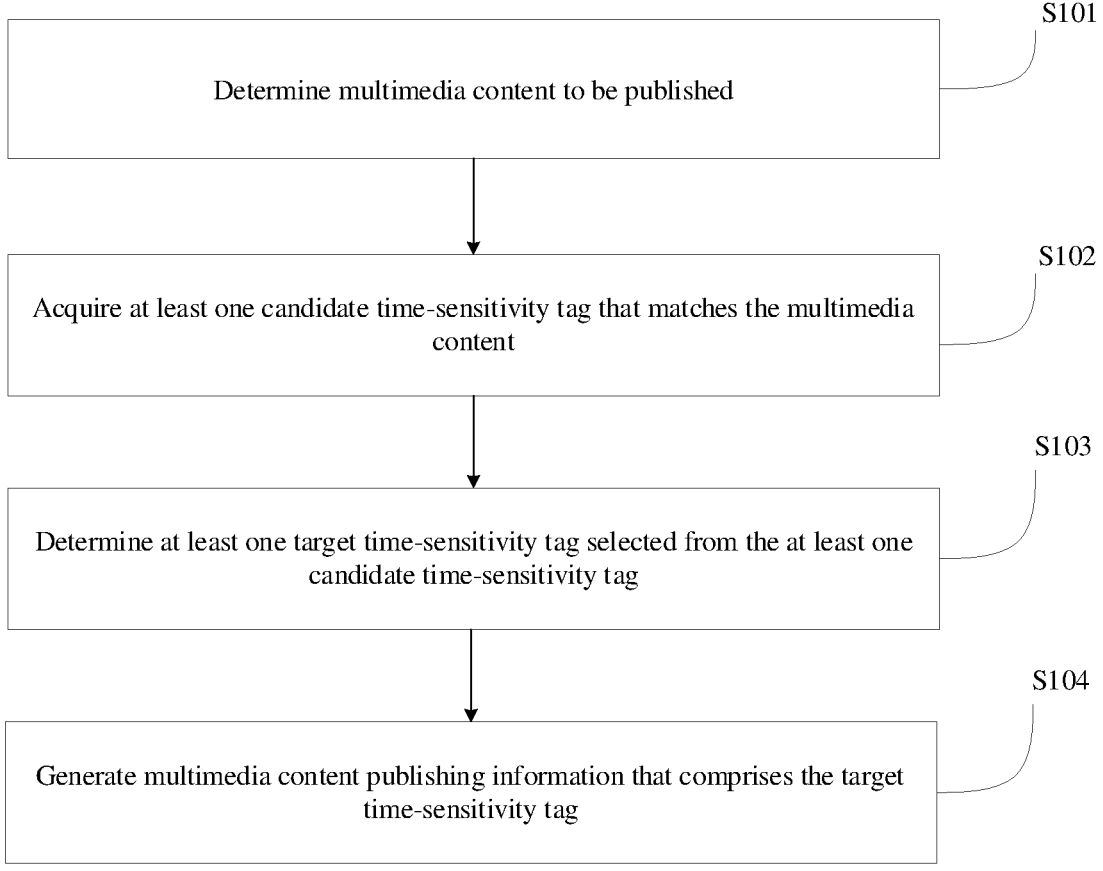
FIG. 1 shows a flowchart of a multimedia content publishing method provided by Embodiment I of the disclosure.

In order to make objectives, technical solutions, and advantages of the embodiments of the disclosure clearer, the technical solutions in the embodiments of the disclosure will be described below clearly and completely with reference to the drawings in the embodiments of the disclosure. Obviously, the described embodiments are only part of the embodiments of the disclosure, but not all the embodiments. The components of the embodiments of the disclosure, which are generally described and shown herein, may be arranged and designed in various different configurations. Therefore, the following detailed description of the embodiments of the disclosure is not intended to limit the scope of the disclosure required to be protected, but only represents selected embodiments of the disclosure. Based on the embodiments of the disclosure, all other embodiments obtained by those skilled in the art without inventive efforts fall within the protection scope of the disclosure.

It is found through research that due to a large quantity of multimedia content published on some popular websites or APPs, for some hot real-time news content, a lot of valuable multimedia content may not be searched and read by users timely, resulting in insufficient utilization of resources and failure to meet search needs of the users.

Based on the above research, the embodiments of the disclosure provide at least one multimedia content publishing solution, which provides users with the ability to select and add time-sensitivity tags, so as to provide accurate search results with time-sensitivity for users.

The defects existing in the above solution are all results of an inventor obtained after practice and careful study. Therefore, a discovery process of the above problems and the solution proposed by the disclosure below for the above problem should be the inventor's contribution to the disclosure in the process of the disclosure.

It should be noted that similar numerals and letters represent like items in the following drawings, therefore, once an item is defined in one drawing, it does not require further definition and explanation in the subsequent drawings.

In order to facilitate the understanding of the present embodiment, a multimedia content publishing method disclosed in the embodiment of the disclosure is first introduced in detail. An executive body of the multimedia content publishing method provided by the embodiment of the disclosure is generally an electronic device with certain computing power. The electronic device includes, for example, a terminal device or a server or other processing devices. The terminal device may be user equipment (UE), a mobile device, a client, a terminal, a cellular phone, a cordless phone, a personal digital assistant (PDA), a hand-held device, a computing device, a vehicle-mounted device, a wearable device, and the like. In some possible implementations, the multimedia content publishing method can be implemented by a processor calling computer readable instructions stored in a memory.

The multimedia content publishing method provided by the embodiment of the disclosure is illustrated below by taking the executive body being the client as an example.

As shown in FIG. 1, a flowchart of a multimedia content publishing method provided by the embodiments of the disclosure is shown. The method includes steps S101 to S104.

S101, determining multimedia content to be published;

S102, acquiring at least one candidate time-sensitivity tag that matches the multimedia content;

S103, determining at least one target time-sensitivity tag selected from the at least one candidate time-sensitivity tag; and

S104, generating multimedia content publishing information that comprises the target time-sensitivity tag.

The above multimedia content publishing method is mainly applicable to application scenarios with multimedia content publishing needs. When publishing multimedia content, relevant tags can be provided to provide search references for subsequent multimedia content query. If only some fixed types of tags such as location and category are provided, hot time-sensitive information of some multimedia content cannot be reflected, resulting in some high-value multimedia contents being ignored by users on the search side, thus not being able to effectively utilize some highly time-sensitive multimedia contents, leading to the waste of resources and the reduction of search service quality.

In order to solve the above problems, the embodiments of the disclosure provide a multimedia content publishing solution based on time-sensitivity tags. This solution provides a function of adding time-sensitivity tags for users based on dynamically updated time-sensitivity tags in order to provide time-sensitive search results for multimedia content search.

The above multimedia content to be published may include multimedia content uploaded by a user. The multimedia content may be pictures, videos, or other forms of multimedia content. Considering the wide application of video search, specific description will be made below by taking a video as an example in most cases. In addition, in some embodiments, the above multimedia content to be published may also include title information added for the uploaded multimedia content.

In the embodiment of the disclosure, in order to facilitate the determination of the multimedia content to be published, a corresponding upload button and information input box may be set on a publishing page of the client. For example, after the user enters the publishing page, the multimedia content uploaded by the user can be acquired in response to a triggering operation performed on the upload button. At the same time, the corresponding title information can be inputted into the information input box. The title information may be represented by related keywords of the multimedia content.

It should be noted that the title information in the embodiment of the disclosure may be manually entered by the user, or may be automatically parsed based on the multimedia content after the client receives the multimedia content uploaded by the user, the disclosure is not limited to such.

Under the condition that the multimedia content to be published is determined, the embodiment of the disclosure can acquire at least one candidate time-sensitivity tag that matches the multimedia content, so that it is convenient for the user to select a target time-sensitivity tag directly related to the user's intent from the at least one candidate time-sensitivity tag.

The candidate time-sensitivity tag in the embodiment of the disclosure may be a media content tag dynamically updated based on the user's real-time search data. The media content tag can dynamically change with a user's real-time search operation, and has high timeliness.

In some embodiments, User real-time search data may be acquired from various search platforms. The search platforms here may be an encyclopedia search platform, a multimedia search platform, or other search platforms. The real-time search data here may be acquired from search records of the above various search platforms within a period closest to current publishing time, may include search terms or search results associated with the search terms.

In this way, under the condition that the real-time search data is acquired from the search platforms, the embodiment of the disclosure can determine updated candidate time-sensitivity tags based on an analysis result of the real-time search data, i.e., once it is determined that a search update has occurred on each search platform accessed within a certain period, the corresponding candidate time-sensitivity tags will be generated and updated.

In the embodiment of the disclosure, in order to facilitate the selection of the target time-sensitivity tag that conforms to the user's intent from the candidate time-sensitivity tags, the above candidate time-sensitivity tags may be displayed at the client first. In order to improve the interaction experience between the user and a publishing platform, the above candidate time-sensitivity tags may be displayed based on a triggering operation performed on a tag adding button set on the publishing page of the client.

It should be noted that the multimedia content publishing method provided by the embodiments of the disclosure may acquire the candidate time-sensitivity tags that match the multimedia content after determining that the multimedia content to be published is time-sensitive content, or may acquire the candidate time-sensitivity tags in response to a time-sensitivity tag acquisition operation.

The above process of determining that the multimedia content to be published is time-sensitive content may be determined by the client based on content attribute information and/or author attribute information associated with the multimedia content uploaded by the user. The content attribute information here may be determined after parsing the multimedia content. In some embodiments, a variety of multimedia content types (such as sport, life, and entertainment) with high time-sensitivity may be predetermined. In this way, under the condition that it is determined that the uploaded multimedia content belongs to the above multimedia content type, it can be determined that the uploaded multimedia content is the time-sensitive content. The author attribute information here may be related information of a provider of the multimedia content. For example, it is more likely that a news writer publishes time-sensitive content. In this way, it can be determined that the uploaded multimedia content is the time-sensitive content based on the author's identity of news writer.

In the embodiment of the disclosure, after the various candidate time-sensitivity tags are determined, the target time-sensitivity tag related to the user's intent can be selected based on a user's selection operation, and the multimedia content publishing information that includes the target time-sensitivity tag can be generated. At this time, in response to a media content publishing request, the multimedia content publishing information that includes the target time-sensitivity tag can be published. For example, in order to facilitate subsequent multimedia search by a server, the above multimedia content publishing information may be sent to the server.

The above multimedia content publishing information may include the multimedia content uploaded by the user, and may also include the title information inputted for the multimedia content. In addition, the multimedia content publishing information may also include publishing time, publishing location and other information.

It should be noted that information related to the privacy of the user, such as the publishing location, may be collected after user authorization is obtained.

For published multimedia content, after a user initiates a search request to the server, multimedia content corresponding to the search request may be pushed to the user based on the target time-sensitivity tag corresponding to the multimedia content. Since the target time-sensitivity tag here identifies multimedia content with high time-sensitivity, it is possible to increase the number of views of multimedia content to some extent.

In the multimedia content publishing method provided by the embodiments of the disclosure, a corresponding publishing button may be set on the publishing page of the client. For example, after the user selects the target time-sensitivity tag, the multimedia content publishing information that includes the target time-sensitivity tag may be published in response to a triggering operation performed on the publishing button.

The multimedia content publishing information in the embodiment of the disclosure may include not only related multimedia content, but also other publishing information. For example, the multimedia content publishing information may include cover page setting information when the multimedia content is published on the publishing page of the client, or may include tag adding information such as a location and a multimedia content source, or may include information related to a publishing permission and publishing time, the disclosure is not limited to such.

Next, the above multimedia content publishing method provided by the embodiment of the disclosure may be illustrated with reference to graphical user interface of a client shown in FIG. 2(a), FIG. 2(b), and FIG. 2(c).

As shown in FIG. 2(a), the publishing page displayed on the client includes an upload button and an information input box. After the user triggers the upload button, video AA can be uploaded, and title information "AA" can also be inputted into the information input box.

In this way, the server can determine, based on the uploaded video AA and the inputted title information "AA", a plurality of candidate time-sensitivity tags, i.e., "Attention on AA", "Development of AA", "Response to AA", and "People involved in AA", that match video AA to be post. At this time, the client can acquire the above candidate time-sensitivity tags from the server based on a triggering operation performed on the tag adding button included on the publishing page displayed, and can correspondingly display the acquired candidate time-sensitivity tags in a corresponding display area of the tag adding button, as shown in FIG. 2(b).

A selection operation may be performed on the various candidate time-sensitivity tags displayed on the current publishing page of the client, to select a target time-sensitivity tag that is closest to the user's intent, i.e., "Attention on AA" and "Development of AA", as shown in FIG. 2(c).

As shown in FIG. 2(c), a publishing button is set on the publishing page. After the publishing button is triggered, the above multimedia content publishing information that includes tags of "Attention on AA" and "Development of AA" can be published to the server.

In addition, as shown in FIG. 2(a), FIG. 2(b) and FIG. 2(c), other multimedia content publishing information may also be set, such as geographic tag adding information, cover page setting information, publishing settings and other related information, which will not be repeated here.

Next, the multimedia content publishing method provided by the embodiments of the disclosure will be further described from the server side.

Embodiment II

As shown in FIG. 3, a flowchart of a multimedia content publishing method provided by Embodiment II of the disclosure is shown. The method includes steps S301 to S304.

S301, acquiring multimedia content to be published;

S302, selecting at least one candidate time-sensitivity tag that matches the multimedia content from a candidate time-sensitivity tag set, and returning the selected at least one candidate time-sensitivity tag to a first client;

S303, receiving multimedia content publishing information that comprises at least one target time-sensitivity tag, the at least one target time-sensitivity tag belonging to the candidate time-sensitivity tags; and S304, publishing the multimedia content based on the multimedia content publishing information.

In the above steps, the content related to multimedia content and multimedia content publishing information can be referred to the relevant description of Embodiment I of the disclosure and will not be repeated herein.

In order to determine a candidate time-sensitivity tag that matches the acquired multimedia content to be published, the embodiment of the disclosure can rely on a correlation between the candidate time-sensitivity tag set and the multimedia content, that is, a time-sensitivity tag with a high correlation with the multimedia content can be selected from the candidate time-sensitivity tag set as the candidate time-sensitivity tag of the multimedia content.

The above candidate time-sensitivity tag set may be generated based on a media content tag dynamically updated by user real-time search data. The process of updating media content tags can be found in the relevant description of Embodiment I above and will not be repeated herein. In this way, whenever the media content tag is updated, an updated media content tag can be added into the candidate time-sensitivity tag set, that is, as the user real-time search data is received, the candidate time-sensitive tag set is also updated, thus making it more time-sensitive.

After the matched candidate time-sensitivity tag is selected for the multimedia content, the selected one or more candidate time-sensitivity tags can be pushed to the client, so that the user can select the target time-sensitivity tag that conforms to his or her intent, and can publish the multimedia content publishing information that includes the target time-sensitivity tag to the server. The selection of the target time-sensitivity tag and the publishing of the multimedia content publishing information can be referred to the relevant description of Embodiment I of the disclosure and will not be repeated herein.

After receiving the multimedia content publishing information sent by the client, the server can publish the multimedia content based on the multimedia content publishing information. Once the corresponding multimedia content is published, since the target time-sensitivity tag with high time-sensitive content included in the multimedia content publishing information may be used as a search basis, the possibility that the multimedia content is searched will be greatly enhanced, thus allowing for increased exposure of multimedia content.

The candidate time-sensitivity tag set in the embodiment of the disclosure may be includes several time-sensitivity tags. In this way, after the multimedia content to be published is acquired from the client, correlations between the multimedia content and the various time-sensitivity tags in the candidate time-sensitivity tag set can be determined, and one or more candidate time-sensitivity tags can be selected from the time-sensitivity tag set based on the correlations.

In some embodiments, the various correlations may be ranked, and time-sensitivity tags with a pre-defined ranking are selected from a ranking result as the candidate time-sensitivity tags. For example, the top 10 time-sensitivity tags may be selected as the candidate time-sensitivity tags.

Considering a key role of the correlation calculation in the selection of the candidate time-sensitivity tags, the calculation process of the correlations may be then described in detail, as shown in FIG. 4. The process for calculating the correlations specifically includes the following steps:

S401, extracting a multimedia feature vector from the multimedia content, and extracting a text feature vector from each time-sensitivity tag in the candidate time-sensitivity tag set;

S402, determining a vector correlation between the multimedia feature vector and each text feature vector; and S403, determining a correlation between the multimedia content and each time-sensitivity tag in the candidate time-sensitivity tag set based on each determined vector correlation.

The multimedia feature vector may be first extracted from the multimedia content, and the text feature vector may be then extracted from each time-sensitivity tag in the time-sensitivity tag set. The vector correlation between the multimedia feature vector and each text feature vector may be determined based on a vector similarity calculation method. Since a vector correlation represents a correlation between a multimedia content and a time-sensitivity tag to a great extent, the correlation between the multimedia content and the time-sensitivity tag can be determined based on the vector correlation between the vectors.

The above extracted multimedia feature vector may be directly extracted from the multimedia content to be published, such as video scene information, video duration information and other features of a video, or may be extracted based on a pre-trained multimedia feature extraction model.

Considering that the multimedia content to be published in the embodiment of the disclosure may include the multimedia content uploaded via the first client, or title information added for the multimedia content, the multimedia feature vector here may be a content feature vector extracted for the uploaded multimedia content, or may be the text feature vector extracted for the added title information.

Under the condition that the extracted multimedia feature vector is a feature vector related to the multimedia content, the multimedia feature extraction model here may be trained by a convolutional neural network (CNN). The network can be trained for an association relationship between the inputted multimedia content and various dimensional attributes thereof. For example, for a video, a 128-dimensional multimedia feature vector may be obtained by training. In the case that the extracted multimedia feature vector is a feature vector of the title information of the relevant multimedia content, the multimedia feature extraction model here may be obtained by one-hot encoding, or by word vector encoding model Word2vec training, thus training for the association relationship between title information and a title vector. For example, a 128-dimensional feature vector may be extracted for the title information of a video.

In addition, the text feature vector of the above time-sensitivity tag may be obtained by encoding the time-sensitivity tag, or by one-hot encoding, or by Word2vec training, the disclosure is not limited to such. For example, a 128-dimensional text feature vector may be extracted for each time-sensitivity tag in the time-sensitivity tag set.

In the embodiment of the disclosure, after the multimedia feature vector of the multimedia content and the text feature vectors of the various time-sensitivity tags are determined, the vector correlations between the vectors can be determined. In one embodiment of the disclosure, the vector correlations can be directly determined by the vector cosine formula, and in another embodiment of the disclosure, the vector correlations can be determined based on a trained correlation model. Considering that the correlation model can mine out more abundant and deeper features to a certain extent, the trained correlation model may be adopted in one embodiment of the disclosure to determine the vector correlations.

The correlation model in the embodiment of the disclosure may be a model related to tag multi-classification, which aims to select tags with higher correlations with the inputted multimedia content from the various tags in the process of training. Considering that traditional classification models generally represent tags by tag IDs, it is necessary to fix the tag set. For example, No. 1 corresponds to the first tag in the tag set, and No. 2 corresponds to the second tag in the tag set.

However, in the application of the embodiment of the disclosure, the tag set (corresponding to the time-sensitivity tag set) is changing in real time. Old tag identifications (IDs) will become invalid, so the tag IDs will no longer have real-time generalization. In order to solve the above problems, the embodiment of the disclosure selects a text encoding method to achieve the objective of generalization. In this way, no matter how a time-sensitivity tag changes, the time-sensitivity tag can be aligned to a text space, and then correlation learning and matching can be performed on the time-sensitivity tag and the multimedia content. Meanwhile, compared with an ID encoding method, the text feature vector obtained by the text encoding adopted in the embodiment of the disclosure can mine out more abundant information, which will be helpful for the subsequent training of the correlation model.

Training sample data for training the correlation model in the embodiment of the disclosure may be determined based on a specific application scenario of the multimedia content publishing method provided by the disclosure, that is, corresponding training sample data may be obtained based on scenario application, and then the correlation model can be trained, specifically including the following steps:

Step I, acquiring multiple historical search terms and a multimedia content search result returned by search initiated based on each historical search term;

Step II, for each multimedia content search result, taking a historical search term associated with the multimedia content search result as a positive class time-sensitivity tag of the multimedia content search result, and taking a historical search term associated with other multimedia content search results other than the multimedia content search result as a negative class time-sensitivity tag of the multimedia content search result; and Step III, taking each multimedia content search result, the positive class time-sensitivity tag of the each multimedia content search result, and the negative class time-sensitivity tag of the each multimedia content search result as one group of training sample data, and training the correlation model to be trained based on a plurality of groups of training sample data to obtain the trained correlation model.

Relevant historical search data such as the various historical search terms and the multimedia content search results returned by the search engine based on each historical search term may be acquired from various search platforms. The multimedia content search results correspond to the historical search terms, that is, the multimedia content search results and the historical search terms are bound together based on search relationships, thus avoiding the time-consuming and labor-intensive problems caused by the need for manual labeling in related technology. For example, if a search term is "BB's new song", returned search results may be videos and titles related to "BB's new song".

As a multi-classification model, the above correlation model can determine the positive and negative class time-sensitivity tags of each multimedia content search result. The multimedia content search results have a higher correlation with the positive class time-sensitivity tags and a lower correlation with the negative class time-sensitivity tags. The positive class time-sensitivity tag of one multimedia content search result may be a search term used to get that multimedia content search result, while the negative class time-sensitivity tag may be a search term for other multimedia content search results.

In the embodiment of the disclosure, each multimedia content search result, with its positive class time-sensitivity tag and negative type time-sensitivity tag, may be used as one group of training sample data to train the correlation model, so as to obtain a model parameter of the correlation model. In this way, after the multimedia content to be published is acquired, the correlation between the multimedia content and each time-sensitivity tag in the time-sensitivity tag set can be determined based on this model parameter.

Considering that in the process of searching multimedia content, multiple multimedia content search results can be obtained based on one historical search term. That is, there is a many-to-one relationship between the multimedia content search results and the historical search terms. Therefore, during the determination of the negative class time-sensitivity tag for one multimedia content search result, in order to avoid the impact of other multimedia content search results simultaneously searched by same search term with the multimedia content search result, on the training recognition rate, the same identifier can be added for the same historical search term of each group of training sample data.

In this way, for each multimedia content search result, other multimedia content search result whose corresponding identifier is different from the identifier of the historical search term corresponding to the multimedia content search result can be determined, and a historical search term corresponding to the other multimedia content search results may be used as the negative class time-sensitivity tag of the multimedia content search result.

In the embodiment of the disclosure, the same search term has the same identifier. If an identification of a target multimedia content search result is consistent with that of another multimedia content search result, the embodiment of the disclosure will not take the historical search term corresponding to another multimedia content search result as the negative class time-sensitivity tag of the target multimedia content search result.

The use of the above negative class time-sensitivity tag determination solution avoids sampling data with the same identifier as a pseudo-negative class and improves the high discriminatory ability of positive and negative classes, which in turn improves the accuracy of the correlation model.

Since the time-sensitivity tag set in the embodiment of the disclosure can be obtained by analyzing the user real-time search data from various search platforms, it is difficult to avoid generation of redundant time-sensitivity tags. For example, based on one search platform, a time-sensitivity tag of "Travel in place B of country A" may be obtained, while based on another search platform, a time-sensitivity tag of "Travel in place B" may be obtained, which leads to the redundancy of time-sensitivity tags. If a redundant time-sensitivity tag is directly pushed to the user, it will not only occupy unnecessary display space, but also degrade the user experience of the publishing platform.

In order to solve the above problem, the embodiment of the disclosure provides a method for performing deduplication processing on a time-sensitivity tag set, as shown in FIG. 5, the above deduplication processing is specifically implemented by the following steps:

S501, taking time-sensitivity tags with the semantic similarity being greater than a predetermined threshold in the candidate time-sensitivity tag set as one time-sensitivity tag group;

S502, for each time-sensitivity tag group, calculating a word overlap degree between each time-sensitivity tag in the time-sensitivity tag group and other time-sensitivity tags in the time-sensitivity tag group except for the time-sensitivity tag, and updating the time-sensitivity tag group based on a plurality of word overlap degrees obtained by the calculation to obtain an updated time-sensitivity tag group; and S503, combining the updated time-sensitivity tag groups to obtain an updated candidate time-sensitivity tag set.

The time-sensitivity tag set may be first clustered based on the semantic similarities between the various time-sensitivity tags in the candidate time-sensitivity tag set to obtain various time-sensitivity tag groups. In this way, for each time-sensitivity tag group, a word overlap degree of any two time-sensitivity tags in the time-sensitivity tag group can be calculated. The word overlap degree can, to a certain extent, indicate a possibility that there is a redundancy between the two time-sensitivity tags. A larger word overlap degree indicates a larger possibility that there is a redundancy, and a smaller word overlap degree indicates a smaller possibility that there is a redundancy. The time-sensitivity tag group can be updated based on the plurality of word overlap degrees corresponding to each time-sensitivity tag group. In this way, the updated candidate time-sensitivity tag set can be determined based on an update result of the time-sensitivity tag group.

In the embodiment of the disclosure, semantic vectors of the various time-sensitivity tags in the candidate time-sensitivity tag set can be extracted first, and then semantic similarities between the time-sensitivity tags is determined by calculating similarities between the semantic vectors.

In the embodiment of the disclosure, the time-sensitivity tags with the same or similar semantics may be included in the same time-sensitivity tag group. In this way, the word overlap degree between any two time-sensitivity tags in one time-sensitivity tag group can be determined. The above word overlap degree can be determined according to the following steps:

Step I, performing word segmentation processing on each of two time-sensitivity tags to be subjected to word overlap degree calculation, to obtain a plurality of time-sensitivity tag words associated with each time-sensitivity tag;

Step II, performing intersection processing on the plurality of time-sensitivity tag words associated with one of the two time-sensitivity tags and the plurality of time-sensitivity tag words associated with the other of the two time-sensitivity tags to obtain a first time-sensitivity tag word set, and performing union processing on the plurality of time-sensitivity tag words associated with one of the two time-sensitivity tags and the plurality of time-sensitivity tag words associated with the other of the two time-sensitivity tags to obtain a second time-sensitivity tag word set; and Step III, determining the proportion of the first time-sensitivity tag word set in the second time-sensitivity tag word set, and taking the determined proportion as the word overlap degree between the two time-sensitivity tags.

The word segmentation processing can be first performed on the two time-sensitivity tags to be subjected to word overlap degree calculation to obtain a plurality of time-sensitivity tag words corresponding to each time-sensitivity tag. The word segmentation in the embodiment of the disclosure may be segmentation word by word, that is, the number of parts obtained by segmentation of one time-sensitivity tag corresponds to the number of words in the time-sensitivity tag. In addition, the embodiment of the disclosure can also determine the words that can be segmented based on a dictionary. For example, for the two time-sensitivity tags of "Travel in place B of country A" and "Travel in place B", the time-sensitivity tag for "Travel in place B of country A" may be segmented into three time-sensitivity tag words such as "country A", "place B" and "Travel", and the tag of "Travel in place B" may be segmented into two time-sensitivity tag words such as "place B" and "Travel".

After the plurality of time-sensitivity tag words corresponding to each of the two time-sensitivity tags are determined, intersection processing and union processing can be performed on the time-sensitivity tag words. The proportion of the first time-sensitivity tag word set obtained by the intersection processing in the second time-sensitivity tag word set obtained by the union processing can be determined as the word overlap degree between the two time-sensitivity tags.

The two time-sensitivity tags of "Travel in place B of country A" and "Travel in place B" are still taken as an example. If the time-sensitivity tag for "Travel in place B of country A" is segmented into three time-sensitivity tag words such as "country A", "place B" and "Travel", and the tag of "Travel in place B" is segmented into two time-sensitivity tag words such as "place B" and "Travel", the first time-sensitivity tag word set obtained by an intersection processing is "Travel in place B" (corresponding to 4 words), and the second time-sensitivity tag word set obtained by a union processing is "Travel in place B of country A" (corresponding to 7 words), then value 4/7 can be used as the word overlap degree between the above two time-sensitivity tags.

In the embodiment of the disclosure, a plurality of word overlap degrees corresponding to each time-sensitivity tag group can be determined by repeating the above word overlap degree calculation process.

In some embodiments, a predetermined threshold (such as 0.5) of a word overlap degree can be set to update the time-sensitivity tag group.

In one implementation, if it is determined that the plurality of word overlap degrees corresponding to one time-sensitivity tag group are all greater than the predetermined threshold, the time-sensitivity tag with the largest number of words in the time-sensitivity tag group is allocated to the updated time-sensitivity tag group, that is, the time-sensitivity tag with more abundant tag information are selected as time-sensitivity tags in the updated time-sensitivity tag group, and other time-sensitivity tags can be deleted. In another implementation, if it is determined that the plurality of word overlap degrees corresponding to one time-sensitivity tag group are all less than or equal to the predetermined threshold, the various time-sensitivity tags in the time-sensitivity tag group can be allocated to the updated time-sensitivity tag group, that is, if the various word overlap degrees are all less than the predetermined threshold value, it is less likely to a certain extent that the time-sensitivity tag group has redundancy. In this case, the updated time-sensitivity tag group can be determined directly based on original time-sensitivity tags of the time-sensitivity tag group.

In yet another implementation, if the plurality of word overlap degrees corresponding to one time-sensitivity tag group include a first word overlap degree that is greater than the predetermined threshold and a second word overlap degree that is less than or equal to the predetermined threshold, the time-sensitivity tag with the largest number of words can be selected from the time-sensitivity tags corresponding to the first word overlap degree, according to the former of the two implementations mentioned above, to update the time-sensitivity tag group, and the time-sensitivity tags corresponding to the second word overlap degree can be processed, according to the latter of the two implementations mentioned above, to update the time-sensitivity tag group.

After updating the time-sensitivity tag group, the multimedia content publishing method provided by the embodiment of the disclosure can update the time-sensitivity tag set accordingly.

In some embodiments, in order to facilitate matching the multimedia content to be published with candidate time-sensitivity tags reflecting higher time-sensitive content, time-sensitivity tags corresponding to a current sampling moment can be acquired from the candidate time-sensitivity tag set based on a predetermined snapshot sampling frequency. For example, snapshot capture is performed once every second on the candidate time-sensitivity tag set.

In some embodiments, all the time-sensitivity tags in the candidate time-sensitivity tag set captured by the current snapshot may be used as the candidate time-sensitivity tags that match the multimedia content. Or, all the time-sensitivity tags captured may be filtered first, and the candidate time-sensitivity tags that match the multimedia content can be determined based on some of time-sensitivity tags obtained by the filtering. For example, a time-sensitivity tag may be determined as a candidate time-sensitivity tag if the time interval between the tag time of this time-sensitivity tag and the current sampling time does not exceed a preset threshold.

In the embodiment of the disclosure, while the multimedia content is published, target time-sensitivity tags associated with the multimedia content can also be stored. Search for high-time-sensitive multimedia content can be achieved based on the various stored target time-sensitivity tags, which can be specifically achieved by the following steps:

Step I, storing target time-sensitivity tags associated with the multimedia content;

Step II, finding, if a search request initiated by a second client is received, a target time-sensitivity tag matching the search request from the stored target time-sensitivity tags associated with the multimedia content; and Step III: pushing multimedia content associated with the found target time-sensitivity tag to the second client.

If the search request initiated by the second client is received, the multimedia content corresponding to the search request can be found based on matching relationships between a search term carried in the search request and the various stored target time-sensitivity tags.

The matching relationships between the search term and the target time-sensitivity tags can be determined based on the similarity between word vectors.

The second client here may be different from the first client. For example, if the first client is a multimedia content publishing terminal, the second client may be a multimedia content search terminal. Since the target time-sensitivity tag is generated based on based on a high time-sensitive content, multimedia content with higher time-sensitive may be pushed to the second client, which can meet the user's search demand for high time-sensitive content and improve the service quality of the search platform.

Those skilled in the art can understand that in the above methods of Detailed Description of the Embodiments, the writing order of the various steps does not mean a strict execution order to constitute any limitation to the implementation process, and the specific execution order of the various steps should be determined by their functions and possible internal logics.

Based on the same inventive concept, the embodiments of the disclosure further provide a multimedia content publishing apparatus corresponding to the multimedia content publishing method. Since the problem-solving principle of the apparatus in the embodiments of the disclosure is similar to that of the above multimedia content publishing method in the embodiments of the disclosure, the implementation of the apparatus can refer to the implementation of the method, and the repetitions will be omitted.

Embodiment III

Figures 6, 7:
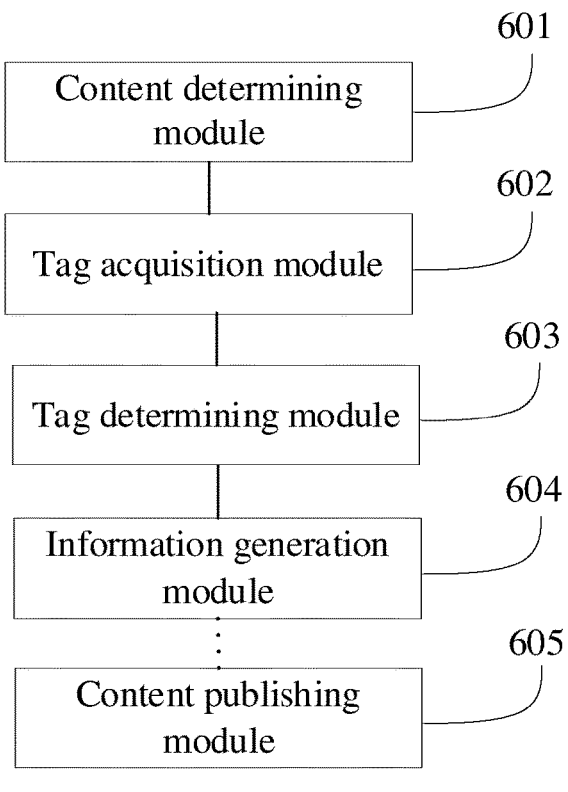
FIG. 6 shows a schematic diagram of a multimedia content publishing apparatus provided by Embodiment III of the disclosure.
FIG. 7 shows a schematic diagram of another multimedia content publishing apparatus provided by Embodiment III of the disclosure.

FIG. 6 illustrates a schematic diagram of a multimedia content publishing apparatus provided by embodiments of the disclosure, the apparatus comprising:

a content determining module 601, configured to determine multimedia content to be published;

a tag acquisition module 602, configured to acquire at least one candidate time-sensitivity tag that matches the multimedia content;

a tag determining module 603, configured to determine at least one target time-sensitivity tag selected from the at least one candidate time-sensitivity tag; and an information generation module 603, configured to generate multimedia content publishing information that comprises the target time-sensitivity tag.

In the multimedia content publishing apparatus provided by embodiments of the present disclosure, the candidate time-sensitivity tags may be time-sensitivity tags that is dynamically updated based on user real-time search data. In this way, the target time-sensitivity tag selected by a publisher reflects highly time-sensitive content, so multimedia content with high time-sensitivity can be provided for subsequent search to a certain extent. In addition, the target time-sensitivity tag is further confirmed and selected by the publisher from the candidate time-sensitivity tags, which further improves the accuracy of the target time-sensitivity tag serving as a query index of multimedia content, so as to provide more accurate and effective search results for users who initiate search requests, and improve the quality of service of a search platform.

In one embodiment, the apparatus further comprises:

Content publishing module 605, configured to publish, in response to a multimedia content publishing request, the generated multimedia content publishing information that comprises the target time-sensitivity tag after generating multimedia content publishing information that comprises the target time-sensitivity tag.

In one embodiment, the tag acquisition module 602 is further configured to acquire at least one candidate time-sensitivity tag that matches the multimedia content based on the following steps:

acquiring, in response to a time-sensitivity tag acquisition operation, at least one candidate time-sensitivity tag that matches the multimedia content; or, acquiring at least one candidate time-sensitivity tag that matches the multimedia content after determining that the multimedia content is time-sensitive content based on content attribute information and/or author attribute information associated with the multimedia content.

In one embodiment, the content determining module 601 is configured to determine multimedia content to be published based on the following steps:

acquiring multimedia content uploaded by a target user and title information added for the multimedia content, and taking the multimedia content uploaded by the target user and the title information as the multimedia content to be published.

FIG. 7 illustrates a schematic diagram of a multimedia content publishing apparatus provided by embodiments of the disclosure, the apparatus comprising:

a content acquisition module 701, configured to acquire multimedia content to be published;

a tag selection module 702, configured to select at least one candidate time-sensitivity tag that matches the multimedia content from a candidate time-sensitivity tag set, and return the selected at least one candidate time-sensitivity tag to a first client;

an information receiving module 703, configured to receive multimedia content publishing information that comprises at least one target time-sensitivity tag, the at least one target time-sensitivity tag belonging to the candidate time-sensitivity tags; and a content publishing module 704, configured to publish the multimedia content based on the multimedia content publishing information.

In one embodiment, the apparatus further comprises:

a content pushing module 705, configured to store target time-sensitivity tags associated with the multimedia content, and find, if a search request initiated by a second client is received, a target time-sensitivity tag matching the search request from the stored target time-sensitivity tags associated with the multimedia content, and push multimedia content associated with the found target time-sensitivity tag to the second client.

In one embodiment, the tag selection module 702 is configured to select at least one candidate time-sensitivity tag that matches the multimedia content from a candidate time-sensitivity tag set based on the following steps:

determining a correlation between the multimedia content and each time-sensitivity tag in the candidate time-sensitivity tag set; and selecting at least one candidate time-sensitivity tag from the candidate time-sensitivity tag set based on the correlation.

In one embodiment, the tag selection module 702 is configured to determine a correlation between the multimedia content and each time-sensitivity tag in the candidate time-sensitivity tag set based on the following steps:

extracting a multimedia feature vector from the multimedia content, and extracting a text feature vector from each time-sensitivity tag in the candidate time-sensitivity tag set;

determining a vector correlation between the multimedia feature vector and each text feature vector; and determining a correlation between the multimedia content and each time-sensitivity tag in the candidate time-sensitivity tag set based on each determined vector correlation.

In one embodiment, the multimedia content to be published comprises multimedia content uploaded by the first client and title information added for the multimedia content, and the tag selection module 702 is configured to extract a multimedia feature vector from the multimedia content based on the following steps:

extracting a content feature vector from the multimedia content uploaded by the first client, and extracting a text feature vector from the title information added for the multimedia content; and determining the extracted content feature vector and the text feature vector as the multimedia feature vector.

In one embodiment, the tag selection module 702 is configured to determine a vector correlation between the multimedia feature vector and each text feature vector based on the following steps:

determining the vector correlation between the multimedia feature vector and each text feature vector by using a trained correlation model.

In one embodiment, the correlation model is trained based on the following steps:

acquiring multiple historical search terms and a multimedia content search result associated with each historical search term;

for each multimedia content search result, taking a historical search term associated with the multimedia content search result as a positive class time-sensitivity tag of the multimedia content search result, and taking a historical search term associated with other multimedia content search results other than the multimedia content search result as a negative class time-sensitivity tag of the multimedia content search result; and taking each multimedia content search result, the positive class time-sensitivity tag of the each multimedia content search result, and the negative class time-sensitivity tag of the each multimedia content search result as one group of training sample data, and training the correlation model to be trained based on a plurality of groups of training sample data to obtain the trained correlation model.

In one embodiment, the negative class time-sensitivity tag of each multimedia content search result is determined based on the following steps:

adding the same identifier for the same historical search term of each group of training sample data; and for each multimedia content search result, determining other multimedia content search result whose corresponding identifier is different from the identifier of the historical search term associated with the multimedia content search result, and taking the historical search term associated with the determined other multimedia content search results as the negative class time-sensitivity tag of the multimedia content search result.

In one embodiment, the apparatus further comprises:

a tag set updating module 706, is configured to: taking time-sensitivity tags with the semantic similarity being greater than a predetermined threshold in the candidate time-sensitivity tag set as one time-sensitivity tag group; for each time-sensitivity tag group, calculating a word overlap degree between each time-sensitivity tag in the time-sensitivity tag group and other time-sensitivity tags in the time-sensitivity tag group except for the time-sensitivity tag, and updating the time-sensitivity tag group based on a plurality of word overlap degrees obtained by the calculation to obtain an updated time-sensitivity tag group; and combining the updated time-sensitivity tag groups to obtain an updated candidate time-sensitivity tag set.

In one embodiment, the tag set updating module 706 is configured to update the time-sensitivity tag group based on a plurality of word overlap degrees obtained by the calculation to obtain an updated time-sensitivity tag group comprises based on the following steps:

allocating the time-sensitivity tag with the largest number of words in the time-sensitivity tag group to the updated time-sensitivity tag group if the plurality of word overlap degrees are all greater than the predetermined threshold;

allocating the time-sensitivity tag with the largest number of words among a plurality of time-sensitivity tags associated with a first word overlap degree to the updated time-sensitivity tag group, and allocating a plurality of time-sensitivity tags associated with a second word overlap degree to the updated time-sensitivity tag group if the plurality of word overlap degrees comprise the first word overlap degree greater than the predetermined threshold and the second word overlap degree less than or equal to the predetermined threshold; and allocating the time-sensitivity tags in the time-sensitivity tag group to the updated time-sensitivity tag group if the plurality of word overlap degrees are all less than or equal to the predetermined threshold.

In one embodiment, the tag set updating module 706 is configured to determine the word overlap degree based on the following steps:

performing word segmentation processing on each of two time-sensitivity tags to be subjected to word overlap degree calculation to obtain a plurality of time-sensitivity tag words associated with each time-sensitivity tag;

performing intersection processing on the plurality of time-sensitivity tag words associated with one of the two time-sensitivity tags and the plurality of time-sensitivity tag words associated with the other of the two time-sensitivity tags to obtain a first time-sensitivity tag word set, and performing union processing on the plurality of time-sensitivity tag words associated with one of the two time-sensitivity tags and the plurality of time-sensitivity tag words associated with the other of the two time-sensitivity tags to obtain a second time-sensitivity tag word set; and determining the proportion of the first time-sensitivity tag word set in the second time-sensitivity tag word set, and taking the determined proportion as the word overlap degree between the two time-sensitivity tags.

In one embodiment, the tag selection module 702 is configured to select at least one candidate time-sensitivity tag that matches the multimedia content from a candidate time-sensitivity tag set based on the following steps:

acquiring a time-sensitivity tag corresponding to a current sampling moment from the candidate time-sensitivity tag set according to a predetermined snapshot sampling frequency; and determining at least one candidate time-sensitivity tag that matches the multimedia content based on the acquired time-sensitivity tag.

The description of the processing flow of the modules in the device, and the interaction flow between the modules can be referred to the relevant description in the method embodiment above, and will not be described in detail here.

Embodiment IV

Figure 8:
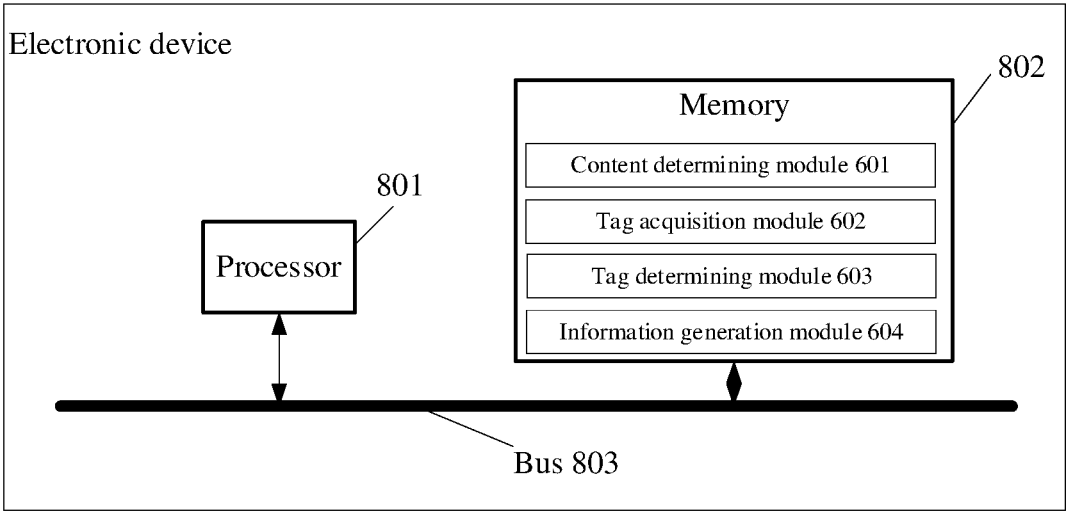
FIG. 8 shows a schematic diagram of an electronic device provided by Embodiment IV of the disclosure.

One embodiments of the disclosure also provide an electronic device, which may be a server or a client. When the electronic device is used as a client, a schematic diagram of the structure of the electronic device provided by embodiments of the disclosure is shown in FIG. 8. The electronic device includes: a processor 801, a memory 802, and a bus 803. The memory 802 stores machine-readable instructions executable by the processor 801 (such as those executed by content determining module 601, tag acquisition module 602, tag determining module 603, and information generation module 603 in the apparatus for multimedia content publishing shown in FIG. 6), and when the electronic device runs, the processor 801 communicates with the memory 802 through the bus 803, and the machine-readable instructions, when executed by the processor 801, cause the processor 801 to perform the following steps:

determining multimedia content to be published;

acquiring at least one candidate time-sensitivity tag that matches the multimedia content;

determining at least one target time-sensitivity tag selected from the at least one candidate time-sensitivity tag; and generating multimedia content publishing information that comprises the target time-sensitivity tag.

In one embodiment, after generating multimedia content publishing information that comprises the target time-sensitivity tag, the instructions further cause the processor 801 to perform operations comprising publishing, in response to a multimedia content publishing request, the generated multimedia content publishing information that comprises the target time-sensitivity tag.

In one embodiment, the acquiring at least one candidate time-sensitivity tag that matches the multimedia content comprises:

acquiring, in response to a time-sensitivity tag acquisition operation, at least one candidate time-sensitivity tag that matches the multimedia content; or, acquiring at least one candidate time-sensitivity tag that matches the multimedia content after determining that the multimedia content is time-sensitive content based on content attribute information and/or author attribute information associated with the multimedia content.

In one embodiment, the determining multimedia content to be published comprises:

acquiring multimedia content uploaded by a target user and title information added for the multimedia content, and taking the multimedia content uploaded by the target user and the title information as the multimedia content to be published.

Figure 9:
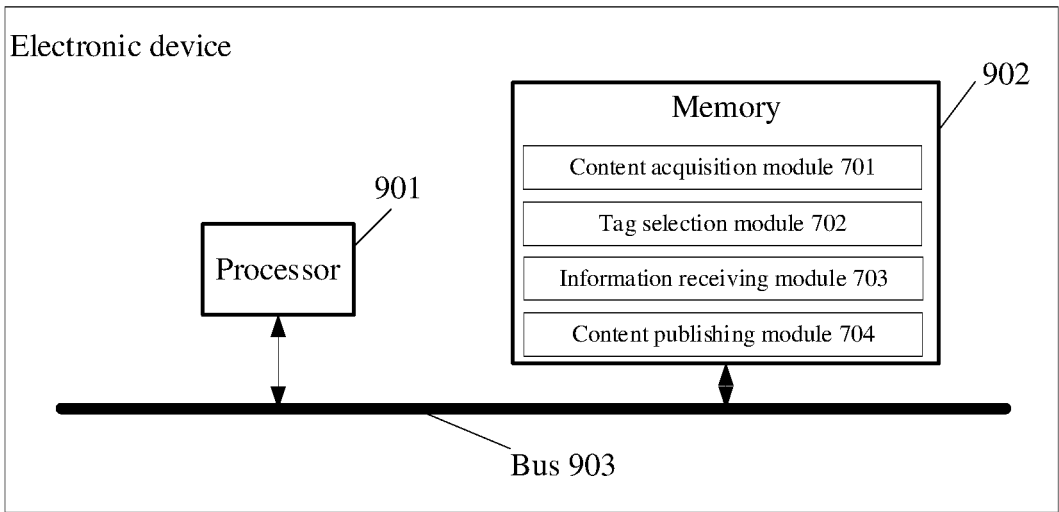
FIG. 9 shows a schematic diagram of another electronic device provided by Embodiment IV of the disclosure.

If the electronic device is used as a server, a schematic diagram of the structure of the electronic device provided by one embodiment of the disclosure is shown in FIG. 9. The electronic device includes: a processor 901, a memory 902, and a bus 903. The memory 902 stores machine-readable instructions executable by the processor 901 (such as those executed by content acquisition module 701, tag selection module 702, information receiving module 703, and content publishing module 704 in the apparatus for multimedia content publishing shown in FIG. 7), and when the electronic device runs, the processor 901 communicates with the memory 902 through the bus 903, and the machine-readable instructions, when executed by the processor 901, cause the processor 901 to perform the following steps:

acquiring multimedia content to be published;

selecting at least one candidate time-sensitivity tag that matches the multimedia content from a candidate time-sensitivity tag set, and returning the selected at least one candidate time-sensitivity tag to a first client;

receiving multimedia content publishing information that comprises at least one target time-sensitivity tag, the at least one target time-sensitivity tag belonging to the candidate time-sensitivity tags; and publishing the multimedia content based on the multimedia content publishing information.

In one embodiment, the instructions further cause the processor 901 to perform operations comprising:

storing target time-sensitivity tags associated with the multimedia content;

finding, if a search request initiated by a second client is received, a target time-sensitivity tag matching the search request from the stored target time-sensitivity tags associated with the multimedia content; and pushing multimedia content associated with the found target time-sensitivity tag to the second client.

In one embodiment, the selecting at least one candidate time-sensitivity tag that matches the multimedia content from a candidate time-sensitivity tag set comprises:

determining a correlation between the multimedia content and each time-sensitivity tag in the candidate time-sensitivity tag set; and selecting at least one candidate time-sensitivity tag from the candidate time-sensitivity tag set based on the correlation.

In one embodiment, the determining a correlation between the multimedia content and each time-sensitivity tag in the candidate time-sensitivity tag set comprises:

extracting a multimedia feature vector from the multimedia content, and extracting a text feature vector from each time-sensitivity tag in the candidate time-sensitivity tag set;

determining a vector correlation between the multimedia feature vector and each text feature vector; and determining a correlation between the multimedia content and each time-sensitivity tag in the candidate time-sensitivity tag set based on each determined vector correlation.

In one embodiment, the multimedia content to be published comprises multimedia content uploaded by the first client and title information added for the multimedia content, and the extracting a multimedia feature vector from the multimedia content comprises:

extracting a content feature vector from the multimedia content uploaded by the first client, and extracting a text feature vector from the title information added for the multimedia content; and determining the extracted content feature vector and the text feature vector as the multimedia feature vector.

In one embodiment, the determining a vector correlation between the multimedia feature vector and each text feature vector comprises:

determining the vector correlation between the multimedia feature vector and each text feature vector by using a trained correlation model.

In one embodiment, the correlation model is trained based on the following steps:

acquiring multiple historical search terms and a multimedia content search result associated with each historical search term;

for each multimedia content search result, taking a historical search term associated with the multimedia content search result as a positive class time-sensitivity tag of the multimedia content search result, and taking a historical search term associated with other multimedia content search results other than the multimedia content search result as a negative class time-sensitivity tag of the multimedia content search result; and taking each multimedia content search result, the positive class time-sensitivity tag of the each multimedia content search result, and the negative class time-sensitivity tag of the each multimedia content search result as one group of training sample data, and training the correlation model to be trained based on a plurality of groups of training sample data to obtain the trained correlation model.

In one embodiment, the negative class time-sensitivity tag of each multimedia content search result is determined based on the following steps:

adding the same identifier for the same historical search term of each group of training sample data; and for each multimedia content search result, determining other multimedia content search result whose corresponding identifier is different from the identifier of the historical search term associated with the multimedia content search result, and taking the historical search term associated with the determined other multimedia content search results as the negative class time-sensitivity tag of the multimedia content search result.

In one embodiment, the instructions further cause the processor 901 to perform operations comprising:

taking time-sensitivity tags with the semantic similarity being greater than a predetermined threshold in the candidate time-sensitivity tag set as one time-sensitivity tag group;

for each time-sensitivity tag group, calculating a word overlap degree between each time-sensitivity tag in the time-sensitivity tag group and other time-sensitivity tags in the time-sensitivity tag group except for the time-sensitivity tag, and updating the time-sensitivity tag group based on a plurality of word overlap degrees obtained by the calculation to obtain an updated time-sensitivity tag group; and combining the updated time-sensitivity tag groups to obtain an updated candidate time-sensitivity tag set.

In one embodiment, the updating the time-sensitivity tag group based on a plurality of word overlap degrees obtained by the calculation to obtain an updated time-sensitivity tag group comprises:

allocating the time-sensitivity tag with the largest number of words in the time-sensitivity tag group to the updated time-sensitivity tag group if the plurality of word overlap degrees are all greater than the predetermined threshold;

allocating the time-sensitivity tag with the largest number of words among a plurality of time-sensitivity tags associated with a first word overlap degree to the updated time-sensitivity tag group, and allocating a plurality of time-sensitivity tags associated with a second word overlap degree to the updated time-sensitivity tag group if the plurality of word overlap degrees comprise the first word overlap degree greater than the predetermined threshold and the second word overlap degree less than or equal to the predetermined threshold; and allocating the time-sensitivity tags in the time-sensitivity tag group to the updated time-sensitivity tag group if the plurality of word overlap degrees are all less than or equal to the predetermined threshold.

In one embodiment, the word overlap degree is determined based on the following steps:

performing word segmentation processing on each of two time-sensitivity tags to be subjected to word overlap degree calculation to obtain a plurality of time-sensitivity tag words associated with each time-sensitivity tag;

performing intersection processing on the plurality of time-sensitivity tag words associated with one of the two time-sensitivity tags and the plurality of time-sensitivity tag words associated with the other of the two time-sensitivity tags to obtain a first time-sensitivity tag word set, and performing union processing on the plurality of time-sensitivity tag words associated with one of the two time-sensitivity tags and the plurality of time-sensitivity tag words associated with the other of the two time-sensitivity tags to obtain a second time-sensitivity tag word set; and determining the proportion of the first time-sensitivity tag word set in the second time-sensitivity tag word set, and taking the determined proportion as the word overlap degree between the two time-sensitivity tags.

In one embodiment, the selecting at least one candidate time-sensitivity tag that matches the multimedia content from a candidate time-sensitivity tag set comprises:

acquiring a time-sensitivity tag corresponding to a current sampling moment from the candidate time-sensitivity tag set according to a predetermined snapshot sampling frequency; and determining at least one candidate time-sensitivity tag that matches the multimedia content based on the acquired time-sensitivity tag.

The specific execution process of the above instructions can be referred to the steps of the method of publishing multimedia content described in Embodiment 1 and Embodiment 2 of the disclosure, and will not be repeated herein.

One embodiment of the disclosure further provides a computer readable storage medium, storing computer program that upon execution by a processor, cause the processor to perform the steps of the multimedia content publishing method described in Embodiment 1 and Embodiment 2 of the disclosure. The storage medium may be a volatile or non-volatile computer readable storage medium.

The computer program product for the multimedia content publishing method provided by embodiments of the disclosure includes a computer readable storage medium on which program code is stored, said program code comprising instructions that can be used to perform the steps of the multimedia content publishing method described in method Embodiment 1 and Embodiment 2 above, as can be seen in the method embodiments above, which will not be repeated herein.

One embodiment of the disclosure further provides a computer program that implements any of the methods of the preceding embodiments when executed by a processor. The computer program product may be specifically implemented by means of hardware, software, or a combination thereof. In one optional embodiment, said computer program product is embodied specifically as a computer storage medium, and in another optional embodiment, the computer program product is embodied specifically as a software product, such as a Software Development Kit (SDK), and the like.

Those skilled in the art can clearly understand that, for the convenience and simplicity of description, the specific working process of the above-described system and apparatus may refer to the corresponding process in the aforementioned method embodiments, and will not be repeated herein. In several embodiments provided in the disclosure, the disclosed system, apparatus, and method may be implemented in other ways. The above-described apparatus embodiments are only schematic. For example, dividing of the units is only a kind of logical function dividing, and there may be other dividing modes in actual implementation. For another example, the plurality of units or components can be combined or integrated into another system, or some features can be ignored or not executed. On the other hand, the mutual coupling or direct coupling or communication connection shown or discussed may be indirect coupling or communication connection through some communication interfaces, apparatuses, or units, and may be electrical, mechanical or in other forms.

The units described as separate parts may or may not be physically separated, and the parts displayed as units may or may not be physical units, that is, they may be in one place or distributed onto a plurality of network units. Part or all of the units can be selected according to actual needs to implement the objectives of the solutions of the present embodiment.

In addition, each functional unit in each embodiment of the disclosure may be integrated into one processing unit, or each unit may exist physically alone, or two or more units may be integrated into one unit.

The function, if implemented in the form of a software functional unit and sold or used as an independent product, may be stored in a nonvolatile computer readable storage medium that can be executed by a processor. Based on this understanding, the technical solutions of the disclosure essentially, or parts contributing to the prior art, or part of the technical solutions can be embodied in a software product form. A computer software product is stored in a storage medium, including a plurality of instructions used to cause an electronic device (may be a personal computer, a server, a network device, etc.) to execute all or part of the steps of the methods in all the embodiments of the disclosure. The aforementioned storage medium includes: a U disk, a mobile hard disk, a read-only memory (ROM), a random-access memory (RAM), a magnetic disk or an optical disk and other media that can store program codes.

Finally, it should be noted that the above embodiments are only specific implementations of the disclosure and are used to illustrate the technical solutions of the disclosure but not limit it. The protection scope of the disclosure is not limited to this. Although the disclosure has been illustrated in detail with reference to the aforementioned embodiments, those skilled in the art should understand that: any person skilled in the art can still modify or easily think of changes to the technical solutions recorded in the aforementioned embodiments, or make equivalent replacement for part of the technical features thereinto within the technical scope disclosed in the disclosure. However, these modifications, changes or replacements do not make the nature of the corresponding technical solutions separate from the spirit and scope of the technical solutions of the embodiments of the disclosure, and should be covered the protection scope of the disclosure. Therefore, the protection scope of the disclosure should be subjected to the protection scope of the claims.

What is claimed is:

1. A method of publishing multimedia content to an online platform, comprising:

determining multimedia content to be published, wherein the multimedia content to be published comprises multimedia content uploaded by a client computing device;

acquiring at least one candidate time-sensitivity tag that matches the multimedia content, wherein the acquiring at least one candidate time-sensitivity tag that matches the multimedia content comprises:

acquiring, in response to a time-sensitivity tag acquisition operation, at least one candidate time-sensitivity tag that matches the multimedia content, or acquiring at least one candidate time-sensitivity tag that matches the multimedia content after determining that the multimedia content is time-sensitive content based on at least one of content attribute information or author attribute information associated with the multimedia content;

determining at least one target time-sensitivity tag selected from the at least one candidate time-sensitivity tag; and generating multimedia content publishing information that comprises the target time-sensitivity tag.

2. The method according to claim 1, wherein after generating multimedia content publishing information that comprises the target time-sensitivity tag, the method further comprises:

publishing, in response to a multimedia content publishing request, the generated multimedia content publishing information that comprises the target time-sensitivity tag.

3. The method according to claim 1, wherein the determining multimedia content to be published comprises:

acquiring multimedia content uploaded by a target user and title information added for the multimedia content, and taking the multimedia content uploaded by the target user and the title information as the multimedia content to be published.

4. A method of publishing multimedia content to an online platform, comprising:

acquiring multimedia content to be published;

selecting at least one candidate time-sensitivity tag that matches the multimedia content from a candidate time-sensitivity tag set, and returning the selected at least one candidate time-sensitivity tag to a first client computing device, wherein the selecting at least one candidate time-sensitivity tag that matches the multimedia content from a candidate time-sensitivity tag set comprises:

selecting, in response to a time-sensitivity tag acquisition operation, at least one candidate time-sensitivity tag that matches the multimedia content from the candidate time-sensitivity tag set, or selecting at least one candidate time-sensitivity tag that matches the multimedia content from the candidate time-sensitivity tag set after determining that the multimedia content is time-sensitive content based on at least one of content attribute information or author attribute information associated with the multimedia content;

receiving multimedia content publishing information that comprises at least one target time-sensitivity tag, the at least one target time-sensitivity tag belonging to the selected at least one candidate time-sensitivity tag; and publishing the multimedia content based on the multimedia content publishing information.

5. The method according to claim 4, further comprising:

storing target time-sensitivity tags associated with the multimedia content;

finding, if a search request initiated by a second client is received, a target time-sensitivity tag matching the search request from the stored target time-sensitivity tags associated with the multimedia content; and pushing multimedia content associated with the found target time-sensitivity tag to the second client.

6. The method according to claim 4, wherein the selecting at least one candidate time-sensitivity tag that matches the multimedia content from a candidate time-sensitivity tag set comprises:

determining a correlation between the multimedia content and each time-sensitivity tag in the candidate time-sensitivity tag set; and selecting at least one candidate time-sensitivity tag from the candidate time-sensitivity tag set based on the correlation.

7. The method according to claim 6, wherein the determining a correlation between the multimedia content and each time-sensitivity tag in the candidate time-sensitivity tag set comprises:

extracting a multimedia feature vector from the multimedia content, and extracting a text feature vector from each time-sensitivity tag in the candidate time-sensitivity tag set;

determining a vector correlation between the multimedia feature vector and each text feature vector; and determining a correlation between the multimedia content and each time-sensitivity tag in the candidate time-sensitivity tag set based on each determined vector correlation.

8. The method according to claim 7, wherein the multimedia content to be published comprises multimedia content uploaded by the first client and title information added for the multimedia content, and wherein the extracting a multimedia feature vector from the multimedia content comprises:

extracting a content feature vector from the multimedia content uploaded by the first client, and extracting a text feature vector from the title information added for the multimedia content; and determining the extracted content feature vector and the text feature vector as the multimedia feature vector.

9. The method according to claim 7, wherein the determining a vector correlation between the multimedia feature vector and each text feature vector comprises:

determining the vector correlation between the multimedia feature vector and each text feature vector by using a trained correlation model.

10. The method according to claim 9, wherein the correlation model is trained based on the following steps:

acquiring multiple historical search terms and a multimedia content search result associated with each historical search term;

for each multimedia content search result, taking a historical search term associated with the multimedia content search result as a positive class time-sensitivity tag of the multimedia content search result, and taking a historical search term associated with other multimedia content search results other than the multimedia content search result as a negative class time-sensitivity tag of the multimedia content search result; and taking each multimedia content search result, the positive class time-sensitivity tag of the each multimedia content search result, and the negative class time-sensitivity tag of the each multimedia content search result as one group of training sample data, and training the correlation model to be trained based on a plurality of groups of training sample data to obtain the trained correlation model.

11. The method according to claim 10, wherein the negative class time-sensitivity tag of each multimedia content search result is determined based on the following steps:

adding the same identifier for the same historical search term of each group of training sample data; and for each multimedia content search result, determining other multimedia content search result whose corresponding identifier is different from the identifier of the historical search term associated with the multimedia content search result, and taking the historical search term associated with the determined other multimedia content search results as the negative class time-sensitivity tag of the multimedia content search result.

12. The method according to claim 4, further comprising:

taking time-sensitivity tags with the semantic similarity being greater than a predetermined threshold in the candidate time-sensitivity tag set as one time-sensitivity tag group;

for each time-sensitivity tag group, calculating a word overlap degree between each time-sensitivity tag in the time-sensitivity tag group and other time-sensitivity tags in the time-sensitivity tag group except for the time-sensitivity tag, and updating the time-sensitivity tag group based on a plurality of word overlap degrees obtained by the calculation to obtain an updated time-sensitivity tag group; and combining the updated time-sensitivity tag groups to obtain an updated candidate time-sensitivity tag set.

13. The method according to claim 12, wherein the updating the time-sensitivity tag group based on a plurality of word overlap degrees obtained by the calculation to obtain an updated time-sensitivity tag group comprises:

allocating the time-sensitivity tag with the largest number of words in the time-sensitivity tag group to the updated time-sensitivity tag group if the plurality of word overlap degrees are all greater than the predetermined threshold;

allocating the time-sensitivity tag with the largest number of words among a plurality of time-sensitivity tags associated with a first word overlap degree to the updated time-sensitivity tag group, and allocating a plurality of time-sensitivity tags associated with a second word overlap degree to the updated time-sensitivity tag group if the plurality of word overlap degrees comprise the first word overlap degree greater than the predetermined threshold and the second word overlap degree less than or equal to the predetermined threshold; and allocating the time-sensitivity tags in the time-sensitivity tag group to the updated time-sensitivity tag group if the plurality of word overlap degrees are all less than or equal to the predetermined threshold.

14. The method according to claim 12, wherein the word overlap degree is determined based on the following steps:

performing word segmentation processing on each of two time-sensitivity tags to be subjected to word overlap degree calculation to obtain a plurality of time-sensitivity tag words associated with each time-sensitivity tag;

performing intersection processing on the plurality of time-sensitivity tag words associated with one of the two time-sensitivity tags and the plurality of time-sensitivity tag words associated with the other of the two time-sensitivity tags to obtain a first time-sensitivity tag word set, and performing union processing on the plurality of time-sensitivity tag words associated with one of the two time-sensitivity tags and the plurality of time-sensitivity tag words associated with the other of the two time-sensitivity tags to obtain a second time-sensitivity tag word set; and determining the proportion of the first time-sensitivity tag word set in the second time-sensitivity tag word set, and taking the determined proportion as the word overlap degree between the two time-sensitivity tags.

15. The method according to claim 4, wherein the selecting at least one candidate time-sensitivity tag that matches the multimedia content from a candidate time-sensitivity tag set comprises:

acquiring a time-sensitivity tag corresponding to a current sampling moment from the candidate time-sensitivity tag set according to a predetermined snapshot sampling frequency; and determining at least one candidate time-sensitivity tag that matches the multimedia content based on the acquired time-sensitivity tag.

16. A client computing device of publishing multimedia content to an online platform, comprising:

at least one processor; and at least one memory communicatively coupled to the at least one processor and storing instructions that upon execution by the at least one processor cause the client computing device to:

determine multimedia content to be published, wherein the multimedia content to be published comprises multimedia content uploaded by the client computing device;

acquire at least one candidate time-sensitivity tag that matches the multimedia content, wherein the acquire at least one candidate time-sensitivity tag that matches the multimedia content comprises:

acquire, in response to a time-sensitivity tag acquisition operation, at least one candidate time-sensitivity tag that matches the multimedia content, or acquire at least one candidate time-sensitivity tag that matches the multimedia content after determining that the multimedia content is time-sensitive content based on at least one of content attribute information or author attribute information associated with the multimedia content;

determine at least one target time-sensitivity tag selected from the at least one candidate time-sensitivity tag; and generate multimedia content publishing information that comprises the target time-sensitivity tag.

17. A server computing device of publishing multimedia content to an online platform, comprising:

at least one processor; and at least one memory communicatively coupled to the at least one processor and storing instructions that upon execution by the at least one processor cause the server computing device to:

acquire multimedia content to be published;

select at least one candidate time-sensitivity tag that matches the multimedia content from a candidate time-sensitivity tag set, and return the selected at least one candidate time-sensitivity tag to a first client computing device, wherein the select at least one candidate time-sensitivity tag that matches the multimedia content from a candidate time-sensitivity tag set comprises:

select, in response to a time-sensitivity tag acquisition operation, at least one candidate time-sensitivity tag that matches the multimedia content from the candidate time-sensitivity tag set, or select at least one candidate time-sensitivity tag that matches the multimedia content from the candidate time-sensitivity tag set after determining that the multimedia content is time-sensitive content based on at least one of content attribute information or author attribute information associated with the multimedia content;

receive multimedia content publishing information that comprises at least one target time-sensitivity tag, the at least one target time-sensitivity tag belonging to the selected at least one candidate time-sensitivity tag; and publish the multimedia content based on the multimedia content publishing information.

* * * * *